Jan. 12, 1943.  D. M. REEVES  2,307,803
STEREOSCOPE
Filed Dec. 2, 1939

INVENTOR
DACHE M. REEVES
BY Edgar W. _____
Wade _____
ATTORNEYS

Patented Jan. 12, 1943

2,307,803

UNITED STATES PATENT OFFICE 2,307,803

STEREOSCOPE

Dache M. Reeves, Langley Field, Va.

Application December 2, 1939, Serial No. 307,290

13 Claims. (Cl. 33—20)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an improvement in stereoscopes, and particularly to a stereoscope device adapted for use in connection with large photographs.

It is an object of this invention to provide a stereoscope mounted and guided for longitudinal and lateral movement, so that selected portions of large photographs may be observed.

It is also an object of this invention to provide, in connection with a stereoscope, a map or contour-drawing device for drawing maps from photographs.

It is a further object of this invention to provide, in connection with a stereoscope, a pair of "floating" marks appearing in the stereoscope as a single image with which all points in the photograph at the same elevation are in focus.

It is another object of this invention to provide means for adjusting the position of said marks to vary the depth or apparent elevation of the image of said marks.

Figure 1:
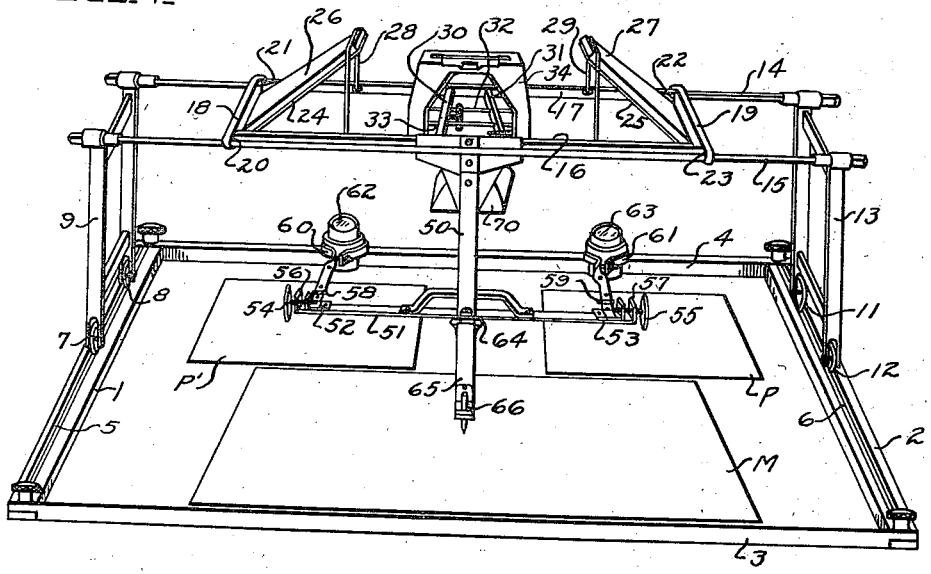
Fig. 1 is a perspective view of a stereoscope and contour or map-drawing atttachment.
Figure 2:
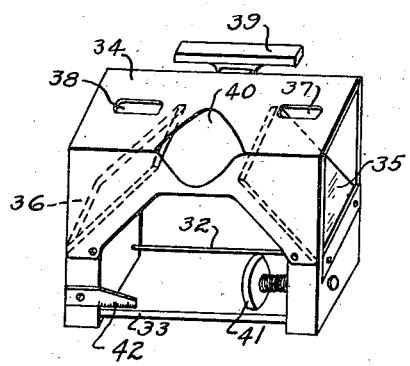
Fig. 2 is an enlarged detail perspective view of the eyeshield and headrest.

The base of the instrument is an open parallelogrammatic frame within which are placed the photographs P and P' to be viewed, as well as the map M on which the desired contours are to be traced. This frame comprises track members 1 and 2, held in place by bars 3 and 4. The tract members are provided with grooves 5 and 6, constituting a trackway for wheels 7 and 8 on end frame 9 and wheels 11 and 12 on end frame 13.

Frames 9 and 13 are rigidly inter-connected by guide rods 14 and 15 to form a rigid bridge movable along the track members and having the guide rods at an appreciable elevation from the base. Slidably supported on the bridge is a rigid open slide frame member composed of longitudinal bars 16 and 17 and crossbars 18 and 19, provided with bearing openings 20, 21, 22, and 23, which slidably embrace guide rods 14 and 15.

Rigidly connected to the frame member are object mirrors 24 and 25 of a multiple mirror stereoscope, suitably fastened to back-plates 26 and 27, which in turn are rigidly connected to crossbars 18 and 19 at one end and to the longitudinal bars 16 and 17 at the other end by means of brackets 28 and 29. Rigidly connected with longitudinal bars 16 and 17 are a pair of bars 30 and 31 for slidably supporting, by means of guide rods 32 and 33, an eyeshield 34 integral therewith. Eyeshield 34 is a box-like member provided with a pair of eye-mirrors 35 and 36, eye slits 37 and 38, a headrest 39 outwardly of the forward edge of the eye shield and a nose rest 40 in the inner edge of the eye shield, said headrest and noserest being suitably placed with reference to the sight openings 37 and 38 to hold the head of the observer steady and to lessen the fatigue of continuous use of the instrument. The eyeshield is also provided with an adjusting screw 41 threadedly engaging with bar 30 and operable for adjusting the eyeshield 34 bodily and linearly on the guide rods for varying the relative lengths of the visual rays from the fixed object mirrors 24 and 25 to the respective eye mirrors 35 and 36. A scale 42, readable against a suitable index on the bar 30, is provided to aid in setting the central unit 34 of the stereoscope in the desired position.

Detachably connected to the bar 16 of the frame is a contour or map-drawing mechanism, comprising a bar 50 adapted to be attached to frame 16 by any suitable means. Rigidly connected to bar 50 is a crossbar 51, having slidably mounted thereon brackets 52 and 53 adjustable by means of screws 54 and 55, which in turn are freely rotatably received in ends 56 and 57 of bar 51 and suitably held against longitudinal movement with respect thereto. Pivotally mounted on brackets 52 and 53 by pins 58 and 59 and bent metal strips 60 and 61 are a pair of index members 62 and 63 having magnifying lenses with reference marks thereon. These are commonly referred to as Hughens eyepieces.

The index members 62 and 63 consist of magnifying lenses, each of which has a reference mark comprising a black dot, cross, or the like, placed at the center thereof. When observed through the stereoscope, these two marks merge visually to form a single image, the apparent depth of which is regulated by the distance apart or the parallactic displacement of the two eyepieces. The image of the mark can be raised or lowered visually by lateral adjustment of the distance apart of the two eyepieces. Since the spacing of the eyepieces is proportional to the difference in elevation of the relief image, the differences in elevation may be measured by bringing the mark successively into coincidence with different objects or different parts of the same object in the relief image and measuring the distance apart of the eye-pieces.

Pivotally connected to bar 51 by means of pin 64 is a pencil-carrying arm 65 having a pencil-receiving sleeve 66 attached thereto. A lamp in reflector 70, suitably attached to the movable frame, provides proper illumination of the pictures.

In the operation of the device as a stereoscope, the contour-drawing or map attachment is removed or the index members 62 and 63 are pivoted about pins 58 and 59 to an out-of-the-way position. Photographs P and P¹—taken from slightly different points of view—are positioned with the portion desired to be observed in relief within the track way, and oriented. The observer looks through eye slits, or sight openings, 37 and 38 to observe images of photographs P and P¹ reflected by mirrors 35—25 and 36—24. In some cases, the photographs may be so large that it is necessary to overlap them for examination and, due to the thickness of the mounts, this may result in the overlapping photograph being appreciably nearer to its associated eye-aperture than the lapped picture is to its corresponding eye-aperture. To compensate for this, the adjustment screw 41 is turned to shift the central unit 34 of the stereoscope to a position between the object mirrors equalizing the lengths of the visual rays from the photographs to the eyes. The stereoscope assembly may be moved forwardly or rearwardly on tracks 1 and 2, or the stereoscope carrying frame may be moved sideways on guide rods 14 and 15 to bring into the observer's range of vision a particular area of the photographs.

In the operation of the apparatus as a stereoscope mapping device, the contour or map-drawing attachment is fixed to the stereoscope frame and photographs P and P¹ are properly oriented. Index members 62 and 63 are then adjusted until the image of the marks therein is at a desired elevation. Points at other elevations will not be in focus with the single image of the two marks. The stereoscope may be moved laterally on guide rods 14 and 15 or longitudinally on track ways 5 and 6 to follow the virtual contour and to trace it on map M. Succeeding contours are similarly produced.

It is to be understood that the description of the invention is by way of illustration only, and that it is intended to be limited only by the appended claims.

I claim:

1. A stereoscope for viewing photographs comprising an open parallelogrammatic base frame within which the photographs to be viewed are placed, track members on two sides of said frame, a rigid bridge spanning the opening in said frame and movable on said track members for adjustment trackwise over the photographs, and a stereoscopic optical system on said bridge and movable lengthwise thereon for adjustment over the photographs in a direction at right angles to the trackwise direction of the photographs.

2. A device as recited in claim 1 and in which the optical system includes a multiple mirror stereoscope in which one set of mirrors is adjustable bodily and linearly between the mirrors of a relatively fixed set to vary the length of the visual rays to one eye with respect to those to the other eye.

3. A stereoscope for viewing photographs comprising a parallelogrammatic base frame having an opening in which are placed the photographs to be viewed and provided on two sides thereof with track members, a rigid bridge spanning the opening in the base frame and movable on said track members for adjustment in a trackwise direction over the photographs, a frame slidable on said bridge for adjustment over the photographs in a direction at right angles to the trackwise dimension of the photographs, and a stereoscopic optical system carried by said frame and including object mirrors fixed to the frame for receiving direct light from the photographs and eye-mirrors mounted on the frame between the object mirrors and adjustable linearly thereon for varying the length of the visual rays to one eye-mirror with respect to those to the other eye-mirror.

4. A stereoscope for viewing photographs comprising a base having track members between which are placed the photographs to be viewed, a bridge supported on said track members and movable thereon for adjustment trackwise of the base into and out of position spanning the photographs, a frame carried by and slidable on the said bridge in a direction at right angles to the direction of the trackwise movement of the bridge, spaced object mirrors fixed to said frame for receiving direct light from the photographs, and eye shield mounted on the frame between the said spaced object mirrors and provided with sight openings and eye mirrors associated therewith and stereoscopically arranged with respect to the object mirrors, said eye shield being bodily and linearly adjustable on the frame for varying the length of the visual rays to one eye-mirror with respect to the length of the visual rays to the other eye-mirror, and connecting means between the eye-shield and the frame operable to adjust the former on the latter.

5. A device as set forth in claim 4 in which the connection means comprises a screw anchored to the eye shield and threadedly engaged with the frame.

6. A device as set forth in claim 4 in which the eye shield is provided with a scale and the frame is provided with an index cooperatively positioned with respect to the scale to aid in setting the eye mirrors to a desired adjustment.

7. A device as set forth in claim 4 in which the eyeshield comprising a box-like member having a noserest in one edge and a headrest outwardly of the opposite edge and suitably placed with reference to the sight openings to hold the head of the observer steady for viewing and to lessen the fatigue of continuous use of the instrument.

8. A stereoscopic device for plotting a map from photographs comprising a base having track members between which are placed the photographs to be viewed, a bridge movable on said track members, a frame movable on said bridge at right angles to the direction of movement of the bridge on the track members, a stereoscope carried by said frame for scanning the photographs, a pair of relatively adjustable index members having reference marks, and means connecting said members to the said frame and supporting the member below the frame and in the field of view of the stereoscope.

9. A device for tracing a map from photographs comprising an open parallelogrammatic base frame within which the photographs are placed, track members on two sides of said frame, a bridge spanning said frame and movable on said track members for adjustment trackwise over the photographs, a stereoscopic optical system on said bridge and movable thereon for adjustment over said photographs in a direction at right angles to the trackwise direction of the photographs, and a map-tracing member connected with said optical system and movable therewith for tracing a map in accordance with the movements of the optical system.

10. A stereoscopic device for plotting a map from photographs comprising a base having track members between which are placed the photographs to be viewed, a bridge movable on said track members and spanning the photographs at an appreciable elevation above the base, a slide member on the bridge and slidable thereon in a direction at right angles to the direction of movement of the bridge on the track members, a stereoscope carried by the slide member for scanning the photographs, a pair of relatively adjustable index members having reference marks thereon, support means connecting said index members to the said slide member and supporting the members in the field of view of the stereoscope, and a tracing element carried by said support means.

11. A stereoscopic device for scanning photographs comprising a base having a pair of spaced parallel grooves constituting trackways between which the photographs to be viewed are placed, a pair of wheels in each groove and freely movable therealong, a rigid frame carried by each pair of wheels and extending perpendicularly of the base, spaced guide rods connecting the wheel-carried frames at the outer ends, an open rigid slide frame between the said guide rods and connected to the latter to be slidable longitudinally therebetween, and a stereoscope mounted on the slide frame for scanning the photographs.

12. A stereoscope device for viewing relatively large photographs comprising a trackway formed of a pair of track members, bar means releasably connected to said track members for maintaining them in spaced relationship, a framework composed of a pair of end members arranged for sliding movement on said trackway, rod means detachably connecting said end members, a second frame carried by said rod means for sliding engagement therewith, an eye shield carried by said second frame, said eye shield having a pair of sight openings and a pair of mirrors associated therewith, and a second pair of mirrors carried by said second frame and stereoscopically arranged in spaced relation with respect to said first pair of mirrors.

13. A topographical stereoscope for producing a map from large photographs comprising a trackway formed of a pair of track members, means releasably connecting said track members to maintain them in spaced relationship, a framework composed of a pair of end members arranged for sliding movement on said trackway, rod means detachably connecting said end members, a second frame carried by said rod means for sliding engagement therewith, an eye shield carried by said second frame, said eye shield having a pair of sight openings and a pair of mirrors associated therewith, a second pair of mirrors carried by said second frame and stereoscopically arranged in spaced relation with respect to said first pair of mirrors, a map drawing attachment detachably connected to said second frame, said attachment including a pair of eyepieces optically positioned in alignment with said second pair of mirrors, said eyepieces having marks therein and being adjustable with respect to each other.

DACHE M. REEVES.